US012639159B2

(12) United States Patent
Wang

(10) Patent No.: US 12,639,159 B2
(45) Date of Patent: May 26, 2026

(54) MEMORY ERROR RECOVERY USING WRITE INSTRUCTION SIGNALING

(71) Applicant: Google LLC, Mountain View, CA (US)

(72) Inventor: Jue Wang, Redmond, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/903,120

(22) Filed: Oct. 1, 2024

(65) Prior Publication Data

US 2025/0028593 A1     Jan. 23, 2025

Related U.S. Application Data

(63) Continuation of application No. 17/709,947, filed on Mar. 31, 2022, now Pat. No. 12,117,895.

(51) Int. Cl.
| | |
|---|---|
| *G06F 11/00* | (2006.01) |
| *G06F 11/07* | (2006.01) |
| *G06F 11/1482* | (2026.01) |

(52) U.S. Cl.
CPC ...... *G06F 11/0793* (2013.01); *G06F 11/0712* (2013.01); *G06F 11/0772* (2013.01); *G06F 11/1484* (2013.01); *G06F 2201/805* (2013.01)

(58) Field of Classification Search
CPC ............. G06F 11/0793; G06F 11/0712; G06F 11/0772; G06F 11/1484

(Continued)

(56) References Cited

U.S. PATENT DOCUMENTS

| | | |
|---|---|---|
| 8,127,174 B1 | 2/2012 | Shah et al. |
| 11,734,038 B1 | 8/2023 | Tsai et al. |

(Continued)

FOREIGN PATENT DOCUMENTS

| | | |
|---|---|---|
| EP | 3859528 A2 | 8/2021 |
| EP | 3916557 A1 | 12/2021 |
| WO | 2013101111 A1 | 7/2013 |

OTHER PUBLICATIONS

Dixit et al. Optimizing Interrupt Handling Performance for Memory Failures in Large Scale Data Centers. Proceedings of the ACM/Spec International Conference on Performance Engineering, ACMPUB27, New York, NY, USA, Apr. 20, 2020 (Apr. 20, 2020), pp. 193-201.

(Continued)

*Primary Examiner* — Sarai E Butler
(74) *Attorney, Agent, or Firm* — Lerner David LLP

(57) ABSTRACT
A system and method for balancing data storage among a plurality of groups of computing devices, each group comprising one or more respective computing devices, each group having an available storage capacity. The method may involve, for each group of computing devices, determining an amount of used storage at the group of computing devices exceeding a predefined first threshold value that is less than the available storage capacity and calculating a storage cost based on the determined amount of used storage exceeding the predefined first threshold value, determining a total storage cost of the plurality of groups of computing devices based on a sum of the calculated storage costs, determining a transfer of one or more projects between the groups of computing devices that reduces the total storage and directing the plurality of groups of computing devices to execute the determined transfer.

16 Claims, 6 Drawing Sheets

(58) Field of Classification Search
USPC ......................................................... 714/1–57
See application file for complete search history.

(56) References Cited

U.S. PATENT DOCUMENTS

| | | | |
|---|---|---|---|
| 2003/0074601 A1 | 4/2003 | Schultz et al. | |
| 2004/0019835 A1 | 1/2004 | Marisetty et al. | |
| 2006/0085670 A1* | 4/2006 | Carver | G06F 11/1008 |
| | | | 714/6.13 |
| 2008/0127182 A1 | 5/2008 | Newport et al. | |
| 2009/0144579 A1* | 6/2009 | Swanson | G06F 11/0712 |
| | | | 718/1 |
| 2009/0248949 A1* | 10/2009 | Khatri | G06F 11/0712 |
| | | | 711/6 |
| 2009/0327638 A1* | 12/2009 | Buch | G06F 11/073 |
| | | | 711/E12.001 |
| 2013/0007507 A1* | 1/2013 | Raj | G06F 11/0793 |
| | | | 714/5.11 |
| 2013/0332781 A1* | 12/2013 | Jayakumar | G06F 11/0751 |
| | | | 714/49 |
| 2014/0181576 A1 | 6/2014 | Chahal et al. | |
| 2014/0188829 A1 | 7/2014 | Ranganathan et al. | |
| 2016/0314057 A1* | 10/2016 | De Oliveira | G06F 11/3612 |
| 2017/0270007 A1 | 9/2017 | Huang et al. | |
| 2017/0315836 A1* | 11/2017 | Langer | G06F 9/45558 |
| 2018/0365044 A1* | 12/2018 | Movsisyan | H04L 41/085 |
| 2019/0026202 A1* | 1/2019 | Chalfant | G06F 11/006 |
| 2019/0034112 A1 | 1/2019 | Tsirkin et al. | |
| 2019/0034297 A1 | 1/2019 | Basur Shankarappa et al. | |
| 2019/0129777 A1* | 5/2019 | Rangarajan | G06F 11/1076 |
| 2019/0303226 A1* | 10/2019 | Kim | G06F 11/073 |
| 2020/0192745 A1 | 6/2020 | Harty et al. | |
| 2021/0216394 A1 | 7/2021 | Gadi et al. | |
| 2021/0286686 A1 | 9/2021 | Prasad | |
| 2023/0281031 A1* | 9/2023 | Hansen | G06F 9/45545 |
| | | | 718/1 |

OTHER PUBLICATIONS

International Search Report and Written Opinion for International Application No. PCT/US2023/015722 dated Jul. 12, 2023. 17 pages.

* cited by examiner

Receive an indication of a memory error generated in response to a write instruction at a virtual machine (VM) of a computing system

310

Instruct to initiate migration of the VM in response to the memory error

320

Migrate the VM from a source machine to a target machine

330

300

Transmit a corrected machine check interrupt (CMCI) signal to the monitoring agent

410

310

Receive the CMCI signal

420

Determine that the CMCI signal is associated with an uncorrectable error

430

320

Transmit a migration instruction to the scheduler based on the CMCI signal being associated with an uncorrectable error

440

330

400

MEMORY ERROR RECOVERY USING WRITE INSTRUCTION SIGNALING

CROSS-REFERENCE TO RELATED APPLICATIONS

The present application is a continuation of U.S. patent application Ser. No. 17/709,947, filed Mar. 31, 2022, the disclosures of which are hereby incorporated herein by reference.

BACKGROUND

As server hardware components continue to decrease in physical size and increase in capacity to meet server capacity demands, the propensity for hardware-based errors correspondingly increases. Therefore, server-based computing systems require high error tolerance in order to function properly and avoid loss of data due to data corruption. This is especially important for single instance configurations, such as in single server database systems or cloud-based virtual machines in which there is no redundancy and no possibility for failover using a replica of the corrupted data.

Typically, errors are detected when the data accessed by a read instruction cannot be read. However, waiting for a read instruction to detect errors has its detriments. Firstly, since data is written into memory for some time before it is read, many unrecoverable errors can go undetected for a significant amount of time. Secondly, using read instructions to perform error detection precludes the ability to detect unrecoverable memory errors in free memory before the free memory is written into. This can lead to situations in which the faulty free memory is consumed by an application before the unrecoverable error is detected, which in turn can lead to the application crashing due to a machine check exception (MCE) from the unrecoverable error, such as kernel panic, a process receiving bus error, and so on.

BRIEF SUMMARY

One aspect of the disclosure is directed to a method for memory error recovery including: receiving, by a monitoring agent, an indication of a memory error generated in response to a write instruction at a virtual machine (VM) of a computing system; and transmitting, by the monitoring agent, an instruction to a scheduler of the computing system to initiate migration of the VM in response to the memory error.

In some examples, the indication of the memory error may be a corrected machine check interrupt (CMCI) signal.

In some examples, the method may further include: determining, by the monitoring agent, that the CMCI signal is associated with an uncorrectable error. Transmitting the instruction to the scheduler may be in response to the determination that the CMCI signal is associated with the uncorrectable error.

In some examples, the monitoring agent may determine that the CMCI signal is associated with the uncorrectable error and transmit the instruction to the scheduler on an order of milliseconds.

In some examples, the monitoring agent may transmit the instruction to the scheduler prior to a read instruction being executed at the VM.

In some examples, the method may further include migrating, by one or more processors, the VM from a source machine to a target machine according to a migration instruction from the scheduler. Migrating the VM from the source machine to the target machine may include: copying memory associated with the source machine to the target machine; detecting, during the copying, the memory error; and injecting a software recoverable action optional (SRAO) machine check exception (MCE) into the copied memory at a memory page containing the memory error, whereby the memory page containing the memory error is isolated.

In some examples, detecting the memory error and injecting the SRAO MCE may be performed by a live migration pre-copy thread.

In some examples, the SRAO MCE may be injected to a single virtual processor core of the computing system.

In some examples, migrating the VM from the source machine to the target machine may include: copying memory associated with the source machine to the target machine; determining whether a memory page containing the memory error is in use by one or more applications; and in response to determining that the memory page is in use, setting a page fault, such that an attempt by the one or more applications to access the memory page avoids an MCE.

In some examples, the method may further include, in response to determining that the memory page is not in use, unmapping the page, such that the page is invisible to the one or more applications.

Another aspect of the present disclosure is directed to a system for memory error recovery including one or more processors and memory in communication with the one or more processors. The memory may contain instructions configured to cause the one or more processors to: perform error monitoring of data being written to a VM of the system; and perform migration of the VM from a source machine to a target machine in response to an uncorrected error with no action (UCNA) detected by the error monitoring.

In some examples, the method may further involve receiving CMCI signaling and interpreting the CMCI signaling as the UNCA.

In some examples, the error monitoring may occur on an order of milliseconds.

In some examples, the instructions may be configured to cause the one or more processors to perform migration of the VM by transmitting an instruction to a scheduler.

In some examples, the instructions may be further configured to cause the one or more processors to: copy memory associated with the source machine to the target machine; detect, during a read operation of the copying, the memory error; and inject an SRAO MCE into the copied memory at a memory page containing the memory error.

In some examples, the instructions may be configured to cause the one or more processors to inject the SRAO MCE into a single virtual processor core of the target machine.

In some examples, the instructions may be configured to cause the one or more processors to: copy the detected memory error to a memory page of the target machine; and either (i) set a page fault, such that an attempt by the one or more applications to access the memory page avoids an MCE; or (ii) unmap the page, such that the page is invisible to the one or more applications. For instance, the instructions may be configured to cause the one or more processors to: determine whether a memory page to which the memory error is copied is in use by one or more applications; and in response to a determination that the memory page is in use, set the page fault, such that the attempt by the one or more applications to access the memory page avoids the MCE. Additionally or alternatively, the instructions may be configured to cause the one or more processors to: determine whether a memory page to which the memory error is copied is in use by one or more applications; and in response to a determination that the memory page is not in use, unmap the page, such that the page is invisible to the one or more applications.

DETAILED DESCRIPTION

Overview

The present disclosure provides a technique for detecting memory errors as early as during write instructions. Memory error signaling from write instructions are not MCEs and, therefore, are not fatal to the system. Instead, such signaling goes through a separate interrupt called corrected machine check interrupt (CMCI) and is processed without resulting fatal behavior.

The technique involves routing a memory error signal that is triggered by a write instruction to an agent. The agent may then analyze the signal and determine from the signal that a memory error has occurred, and may further instruct a scheduler to migrate away from the original or source host VM before the error is consumed by a read instruction. In the case of a computing system hosting a plurality of virtual machines (VMs), this may involve migrating the VM from the source host VM to a new target host VM via a live migration flow. In this respect, the agent not only detects the error earlier than in read instruction-based techniques, but also avoids a crash due to an application later attempting to read the error.

Another aspect of the present disclosure provides for early isolation of uncorrectable storage errors. Since migration of the VM to the target host involves reading the error from guest memory of the source host VM, the error may be detected a second time during the read instruction from the guest memory, and signaled to the target host VM in the form of a software recoverable action optional (SRAO) MCE. Injecting the SRAO MCE into the target host VM has the effect of isolating the memory error at the guest page to which it is written in the target host VM, thereby avoiding future consumption of the error by an application. In some examples, the SRAO MCE injection may be implemented using a virtualization layer. The SRAO MCE can be replaced with an un-corrected no action (UCNA) error injected into the guest operating system (OS). The UCNA error is a non-fatal error signal, thus making it easier to isolate memory errors on free guest pages without interfering with the applications operating at the guest.

The memory error detection techniques described herein have several advantages. Firstly, use of write instruction-based signaling to detect errors achieves faster detection. Secondly, since errors are detected earlier, unrecoverable memory errors are isolated sooner, reducing the chance of an application consuming the error, an MCE, or both. Third, using SRAO MCE injection to the guest memory during live migration allows for free memory pages at the target host VM to be isolated before any read instruction at all at the free memory page. Fourth, since many errors are recoverable but the chances of recovery wane as unrecoverable errors accumulate, early detection and isolation of unrecoverable errors can improve the overall recovery rate of the computing system.

EXAMPLE SYSTEMS

Figure 1:
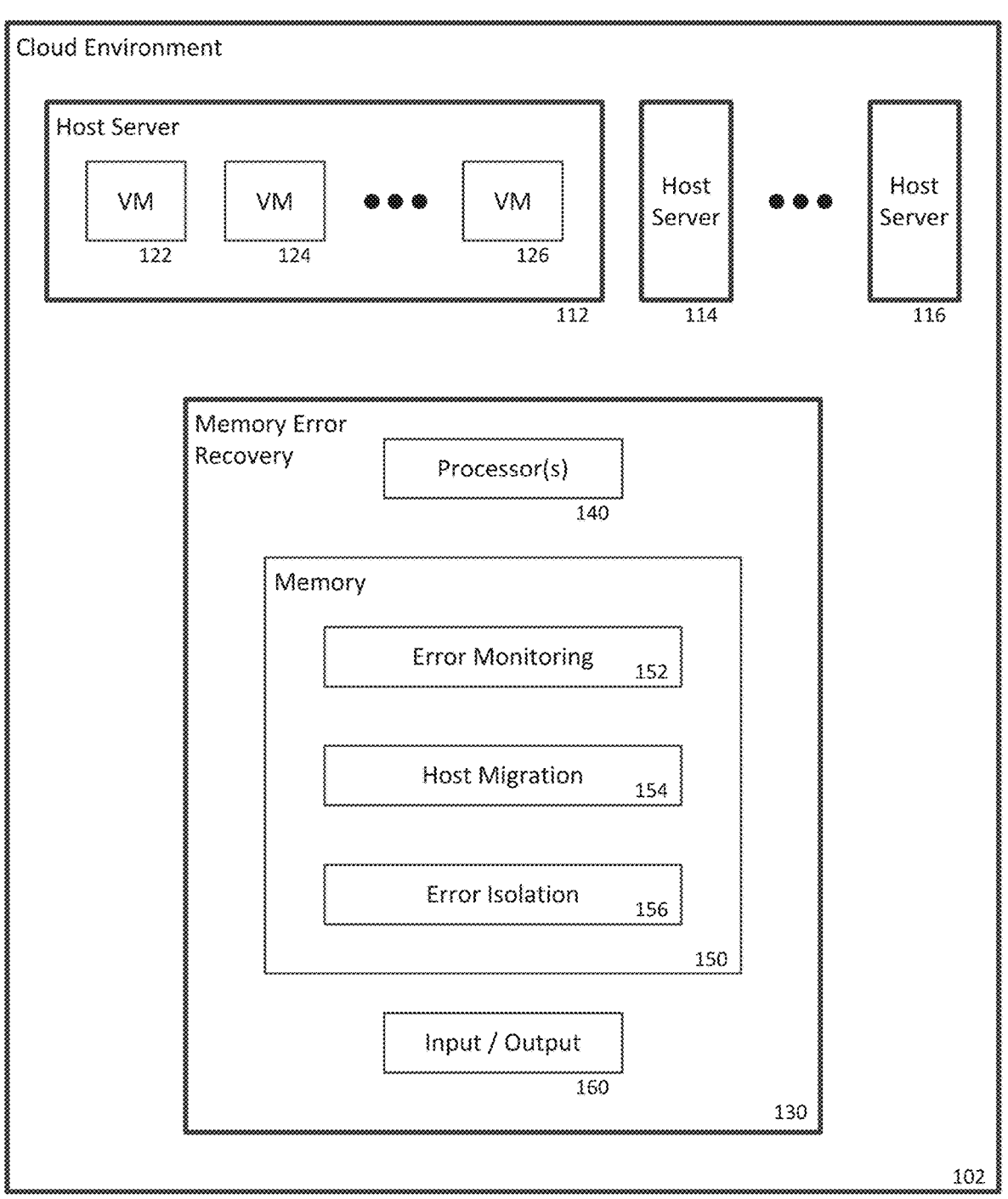
FIG. 1 is a block diagram of an example system in accordance with an aspect of the present disclosure.

FIG. 1 illustrates an example system 100 including a cloud environment 102. The cloud environment 102 may be a distributed database including one or more data centers. The data centers may include computing and storage resources distributed across a plurality of servers and other computing devices. The servers and other devices may communicate with each other, for example, over a network. The servers and other devices may further communicate with one or more client computing systems. In operation, data may be received from the client computing systems and written to storage at the cloud environment 102, or data may be read from storage at the cloud environment.

In the example of FIG. 1, the computing resources of the cloud environment are shown as being divided among a plurality of host servers 112, 114, 116. Each host server 112, 114, 116 may host one or more virtual machines 122, 124, 126. Each virtual machine (VM) may be assigned an amount of processing power, such as an amount of processors or cores, as well as an amount of random access memory for storing received data and for competing various tasks or workloads that are provided to the cloud environment 102. VMs may be associated with users or groups of users of the cloud environment 102, or with projects and workloads executed by the users or groups. Associating VMs with users, groups, projects or workloads may involve dedicating computation and memory resources to a given user or group, providing computation and memory resources in an on-demand basis, or a combination thereof. Thus, computation and memory resources may be scaled as necessary by adding or subtracting from the VMs of a given user, group, project or workload. Additionally or alternatively, computation and memory resources of a given user, group, project or workload may be increased, decreased, or preserved by migrating data from one VM to another VM.

The system 100 may further include a memory error recovery subsystem 130 for avoiding memory errors that can cause a host server to crash. Avoiding such memory errors, and particularly the host server from crashing, is especially beneficial in an environment in which multiple VMs can co-exist on the same host server, such as the cloud environment of FIG. 1, since the memory error during an operation of one VM has a large blast radius, potentially affecting not only that VM but also the other VMs existing on the same host server.

The memory error recovery subsystem 130 may include a processor 140, memory 150 and communication devices 160 for receiving inputs and transmitting outputs.

The processor 140 can be a well-known processor or other lesser-known types of processors. Alternatively, the processor 140 can be a dedicated controller such as an ASIC.

The memory 150 may be a type of non-transitory computer readable medium capable of storing information accessible by the processor 110, such as a hard-drive, solid state drive, tape drive, optical storage, memory card, ROM, RAM, DVD, CD-ROM, write-capable, and read-only memories. The memory 150 can store information accessible by the processor 140, including data that can be retrieved, manipulated or stored by the processor 140. The memory 150 can also include instructions that can be executed by the processor 140. In the example system 100 of FIG. 1, the memory 150 is shown to include data and instructions for executing an error monitoring routine 152 that detects memory errors occurring during read or write operations at a VM 122, 124, 126 of the system 100. The memory 150 is also shown to include data and instructions for executing a host migration routine 154 that moves a VM off the VM's original or source host server to a new or target host server before the source host server crashes due to the memory error. The memory 150 is also shown to include data and instructions for executing an error isolation routine 154 that isolates a page of guest memory containing the detected error so that the page is either invisible or returns a page fault error to an application attempting to access the page.

The communication devices 160 may be capable of direct and indirect communication with one another, with client devices, or any combination thereof, over a network. The network, and intervening nodes, may include various configurations and protocols including the Internet, World Wide Web, intranets, virtual private networks, wide area networks, local networks, private networks using communication protocols proprietary to one or more companies, Ethernet, WiFi (e.g., 702.71, 702.71b, g, n, or other such standards), and RPC, HTTP, and various combinations of the foregoing. Such communication may be facilitated by a device capable of transmitting data to and from other computers, such as modems (e.g., dial-up, cable or fiber optic) and wireless interfaces.

Figure 2:
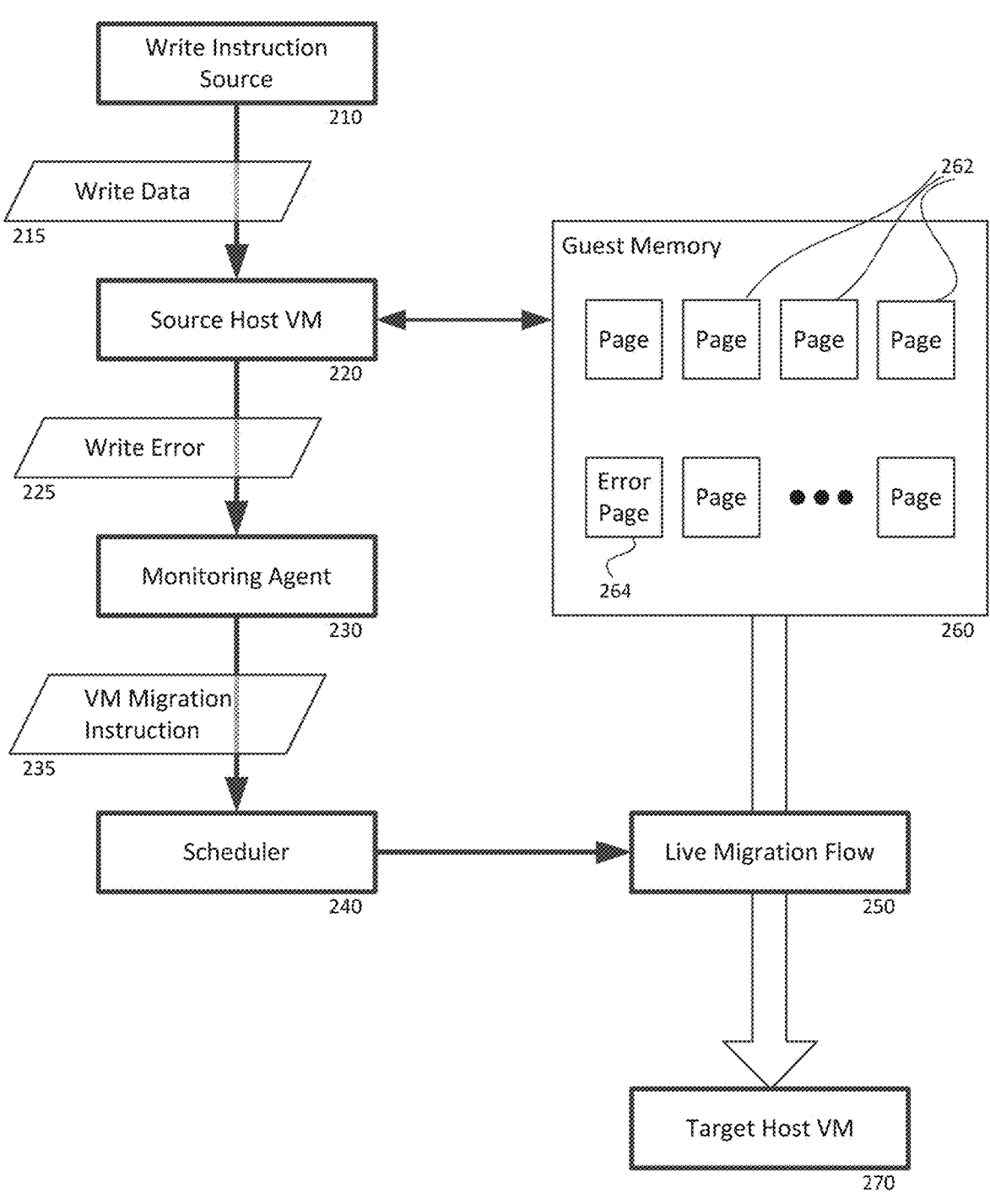
FIG. 2 is a block diagram of an example data flow in accordance with an aspect of the present disclosure.

FIG. 2 is a diagram illustrating data flow through an example system 200 of the present disclosure. The example system 200 may be the same system as the system of FIG. 1, or may be a different system. In the example of FIG. 2, initially, a write instruction is transmitted from a write instruction source 210 to a source host VM 220. The write instruction source 210 may be any device in communication with the source host VM 220, such as another host server, a user device, or any other computing device within the network of the source host VM 220. The write instruction may instruct the source host VM to write received write data 215 to memory of the VM 220.

During writing of the write data 215 to the memory of the source host VM 220, a write error may occur. The write error may be a result of a hardware error at the host server hosting the source host VM 220. The write error 225 may be transmitted from the source host VM to an error monitoring agent 230 included in the system 200. The error monitoring agent 230 may be host memory error monitoring daemon configured to decode the received write error 220. The monitoring agent 230 may be able to determine from the decoded write error 225 whether the error is an uncorrectable memory error, and may take further action in response to determining that the error is an uncorrectable memory error.

For example, the source host VM 220 may be programmed to output a corrected machine check interrupt (CMCI) error in response to the write error 225. This programming may involve configuring the system BIOS of the such that CMCI signaling is enabled for uncorrectable errors that are consumed by write instructions and digital memory access (DMA) devices. The CMCI signaling may be coded as an un-corrected no action (UCNA) error representing the detected uncorrectable memory error. In this manner, a monitoring agent 230 such as a memory error monitoring daemon will receive and interpret the UCNA error as an uncorrectable error, and thus will respond to the write error 225 in the same way that it would respond to a machine check exception (MCE) from a read error. However, by taking action in response to the UCNA error instead of waiting for an MCE error, the error can be handled and isolated much quicker, and particularly before an MCE error causes the host server to crash.

Further action taken by the monitoring agent 230 may include transmitting a VM migration instruction 235 to a scheduler 240 of the system 200. The scheduler 240 may be configured to manage the assignment of data, workloads and projects among VMs of the system. Management may include migration of VMs from one source host server to another target host server. Management may further include any one or combination of balancing assignments between VMs, such as in response to computation or memory needs, adding new data sets, workloads or projects to existing VMs, creating new VMs from available resources.

The monitoring agent 230 may include a low-latency buffer for receiving the CMCI signaling. Using a low latency buffer may shorten the time it takes for the monitoring agent 230 to process the write error 225. For instance, accessing the write error 225 from the buffer, decoding the error to determine the presence of an uncorrectable error, and transmitting the VM migration instruction to the scheduler 240 in response to the determination, may take the monitoring agent 230 on the order of milliseconds. The shortened response time is further advantageous for ensuring that data is not read from the faulty source host VM 220 before the data can be migrated to another target host VM.

In operation, the scheduler 240 may initiate a live migration flow 250 to move data from memory 260 associated with the source host VM 220 to a new, target host VM 270. The live migration flow 250 may involve reading data from the memory 260 associated with the source host VM 220 so that the data can be copied over to the target host VM 270. Reading the data gives the system a second opportunity to identify and address the error without waiting for a separate write instruction source to issue read instructions to the faulty memory of the source host VM 220. In the example of FIG. 2, the memory 260 associated with the source host VM is guest memory that is virtually assigned to the host. The guest memory 260 may include a plurality of memory pages 262, one of which may be the error page 264 containing the error indicated by the initially received write error 225. Additionally the live migration operation 250 is an opportunity to identify any other errors or faults included in the data previously written to the VM. Since all guest memory is copied in the live migration, and since the guest memory typically represents the vast majority of memory utilized by the source host VM, oftentimes about 95% of the memory, it is expected that live migration can detect both the initial and most of other existing uncorrectable memory errors. This detection may occur in a pre-copy phase of the live migration, such as during execution of live migration (LM) pre-copy threads. The LM pre-copy threads may be enriched with the ability to recover from and record uncorrectable memory errors so that the live migration process does not itself result in the host server crashing. In this regard, one example technique for enriching the pre-copy thread is to establish a signaling framework that responds to a bus error signal with an instruction jump for ignoring the error, and further by copying memory associated with the bus error so that such memory errors are guaranteed to be recoverable. One way of copying memory is with a memcpy( ) function, whereby the input of the function is defined by the detected error.

The live migration flow operation 250 initiated by the scheduler 240 may copy over the data from guest memory of the source host VM to memory of a target host VM 270. As with the source machine, the memory of the target machine may be guest memory including a plurality of pages. Because copying the data includes copying over the error, any memory page 264 including a detected error may be isolated in the live migration process to prevent that page from being accessed in the future, or if accessed to prevent the access request from resulting in the target host server crashing. Further details of example error isolation operations are described herein in correction with FIG. 6.

Example Methods

The routines executed by the monitoring agent and scheduler of the system described herein, as well as other routines, are described in greater detail in connection with the diagrams of FIGS. 3-6. It should be understood that the routines described herein are merely examples, and in other examples, certain steps may be added, subtracted, replaced or reordered.

Figure 3:
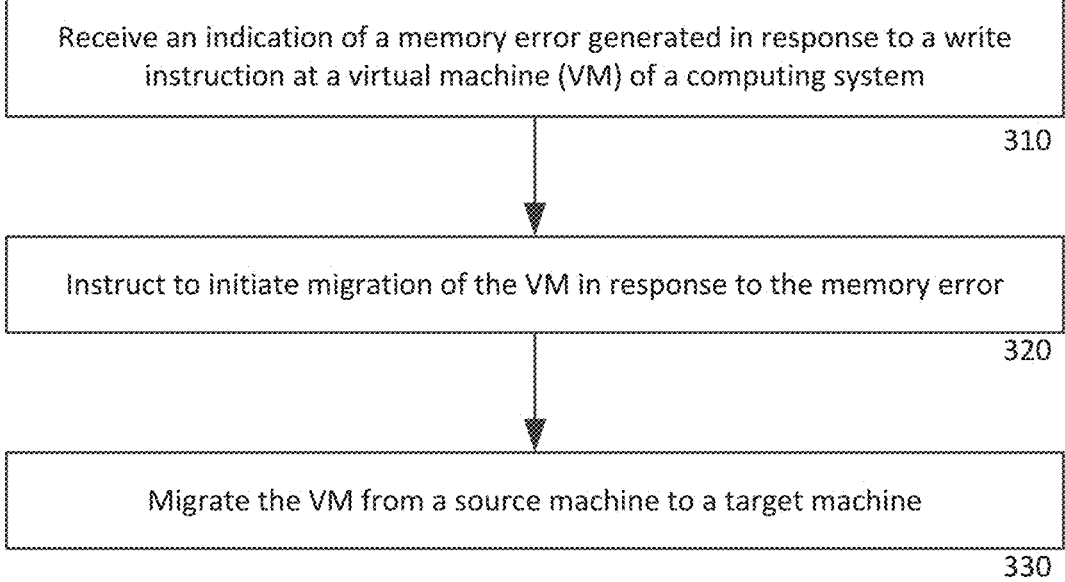
FIG. 3 is a flow diagram of an example memory error recovery routine according to an aspect of the present disclosure.

FIG. 3 is a flow diagram illustrating an example routine 300 for VM migration based on a detected write error. Certain steps of the routine may be performed by one or more processors of a memory error recovery subsystem, such as the subsystem 130 shown in the example system 100 of FIG. 1. More specifically, some steps may be performed by one or more processors associated with a monitoring agent for monitoring errors, some steps may be performed by one or more processors of a scheduler, one or more steps may be performed by a different component of the system, or some combination of the above.

At block 310, the one or more processors may receive an indication of a memory error generated in response to a write instruction at a VM of a computing system. The memory error may be an uncorrectable memory error for which it may be desired to migrate data from the memory having the uncorrectable memory error to a different memory. At block 320, the one or more processors respond to the indication of a memory error by instructing to initiate a migration of the VM. At block 330, the one or more processors migrate the VM from the source machine to a target machine. Source and target machines may be separate host servers of a cloud environment.

Figure 4:
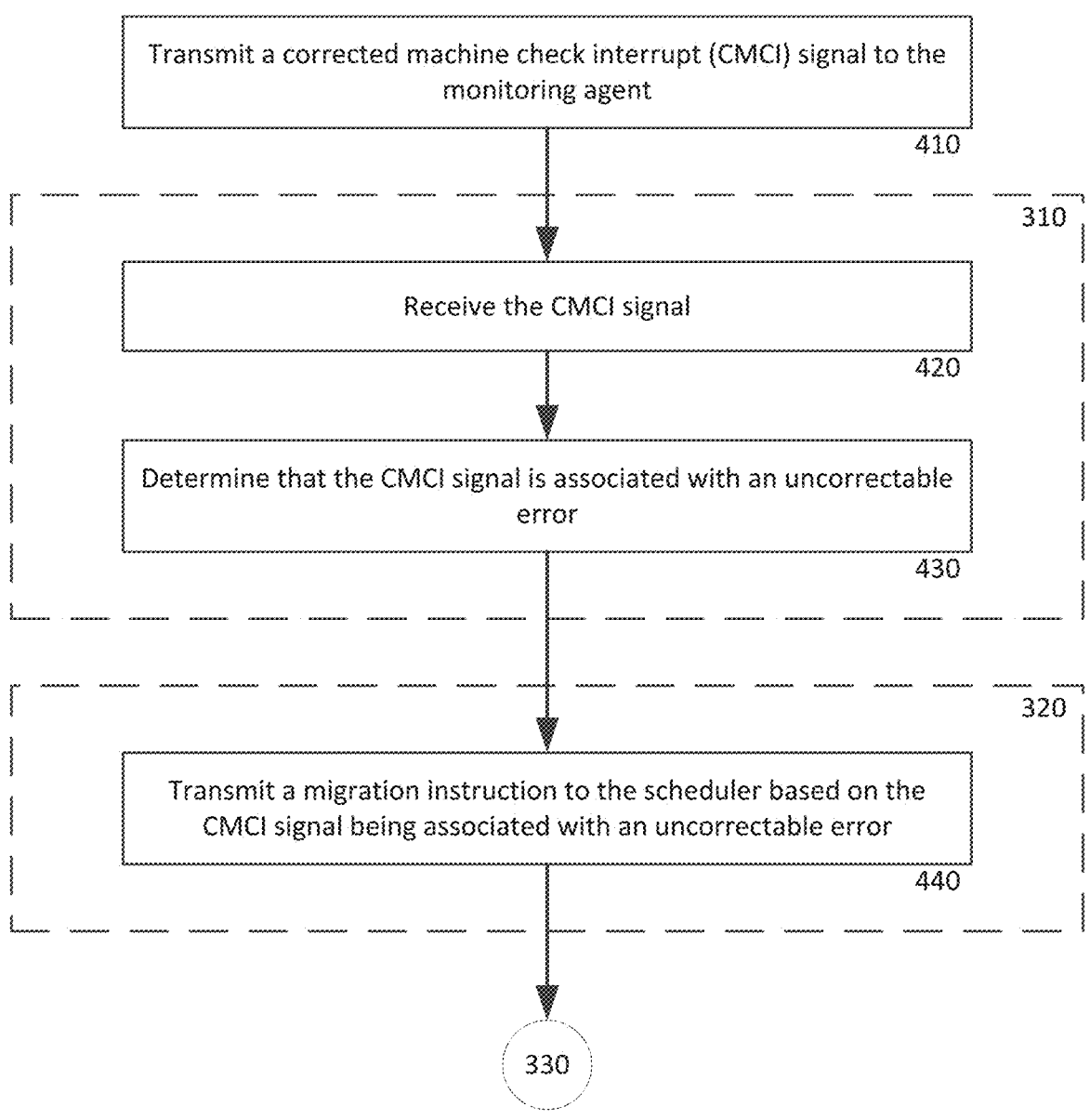
FIGS. 4-6 are flow diagrams of example subroutines of the routine of FIG. 3.

FIG. 4 is an example subroutine 400 for detecting a write error. The subroutine 400 begins at block 410, in which one or more processors transmit a CMCI signal to the monitoring agent. The one or more processors may be pre-programmed to respond to the write error using CMCI signaling so that the write error is passed to the monitoring agent and so that the monitoring agent act quickly in response to the error.

At block 420, the monitoring agent may receive the CMCI signal from the host VM at which the write error occurred. Next, at block 430, the monitoring agent may determine that the CMCI signal is associated with an uncorrectable error. The monitoring agent may be programmed to interpret the semantic of UCNA errors as uncorrectable memory errors. By recognizing a UCNA error from the CMCI signal, the monitoring agent can determine that the error is uncorrectable and may take further action.

At block 440, the monitoring agent may transmit a migration instruction to the scheduler based on the CMCI signal being associated with an uncorrectable error. Operations may then shift to the scheduler, whereby memory of the host VM may be migrated to a different target VM to avoid future crashes at a server or other supporting hardware of the host VM, thus leading host drain and VM migration within in a time before the error can be read by any VM or kernel. The speed of the VM migration from the time of the detected write error may be comparable to the speed of a conventional VM migration in response to a read error, such as from signaling indicating an MCE error. This speed may be on the order of milliseconds, although some systems may experience faster or slower speeds.

Figure 5:
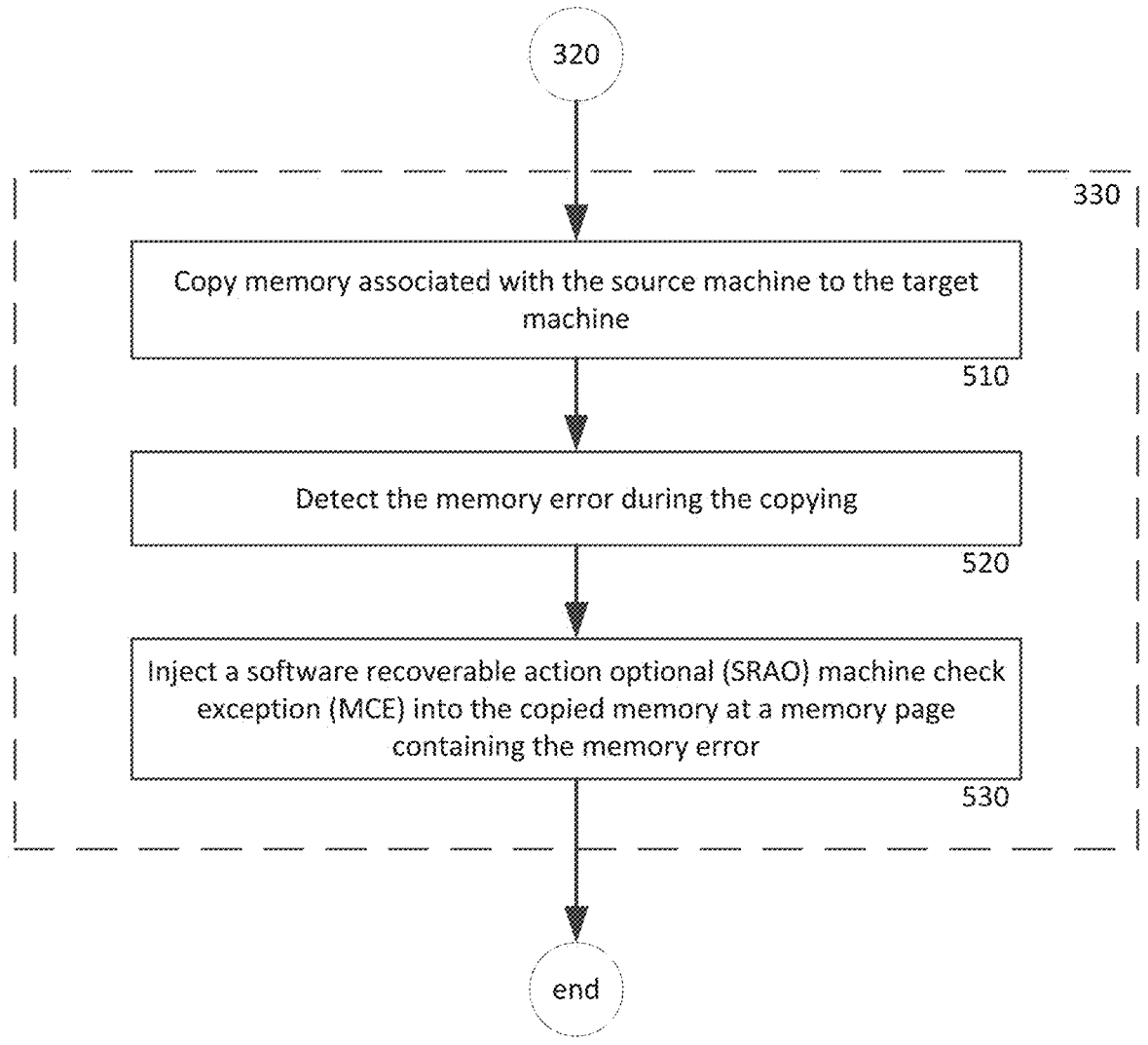

FIG. 5 is an example subroutine 500 for migrating the VM from a source machine to a target machine. At block 510, one or more processors may copy memory associated with the source machine to the target machine. Copying the memory may involve both read operations at the source and write operations at the target. Since there is an error in the memory at the source at it would be undesirable for the read operations to result in MCE signaling, reading the memory from the source may involve a pre-copy pass through the data.

At block 520, during the copying, the one or more processors may detect the memory error. The detection may occur during the pre-copy pass.

At block 530, in order to further avoid a crash from MCE signaling, the one or more processors may respond to the detected memory error by classifying the error as a software recoverable action optional (SRAO) MCE error. In contrast to a software recoverable action required (SRAR) MCE which discontinues the operation in order to avoid an ever greater loss of data, the SRAO MCE error responds by isolating the error and not discontinuing the underlying process. Thus, the SRAO MCE error prevents further harm due to the detected error while also not causing greater harm by discontinuing the copying process.

Injection of the SRAO MCE may be to a single virtual processor core of the target machine. Additionally, or alternatively, injection of the SRAO MCE may be implemented as a virtual SRAO MCE. Hardware SRAO MCEs are typically broadcasted to all CPU cores of a target host. This requires synchronization across all MCE handlers of the target host, and the synchronization can be slow and also cause nested MCEs and the host to crash. By contrast, injecting a virtual SRAO MCE to a guest VM can take the form of a UCNA, which avoids the SRAO MCE from nesting and thus avoids crashes at the target host machine.

Copying the memory from the source VM to a target VM may involve accessing and copying guest memory. Typically, 95% of the VM memory may be guest memory, meaning that copying the guest memory can successfully detect most potential errors that would arise from reading the source VM.

Figure 6:
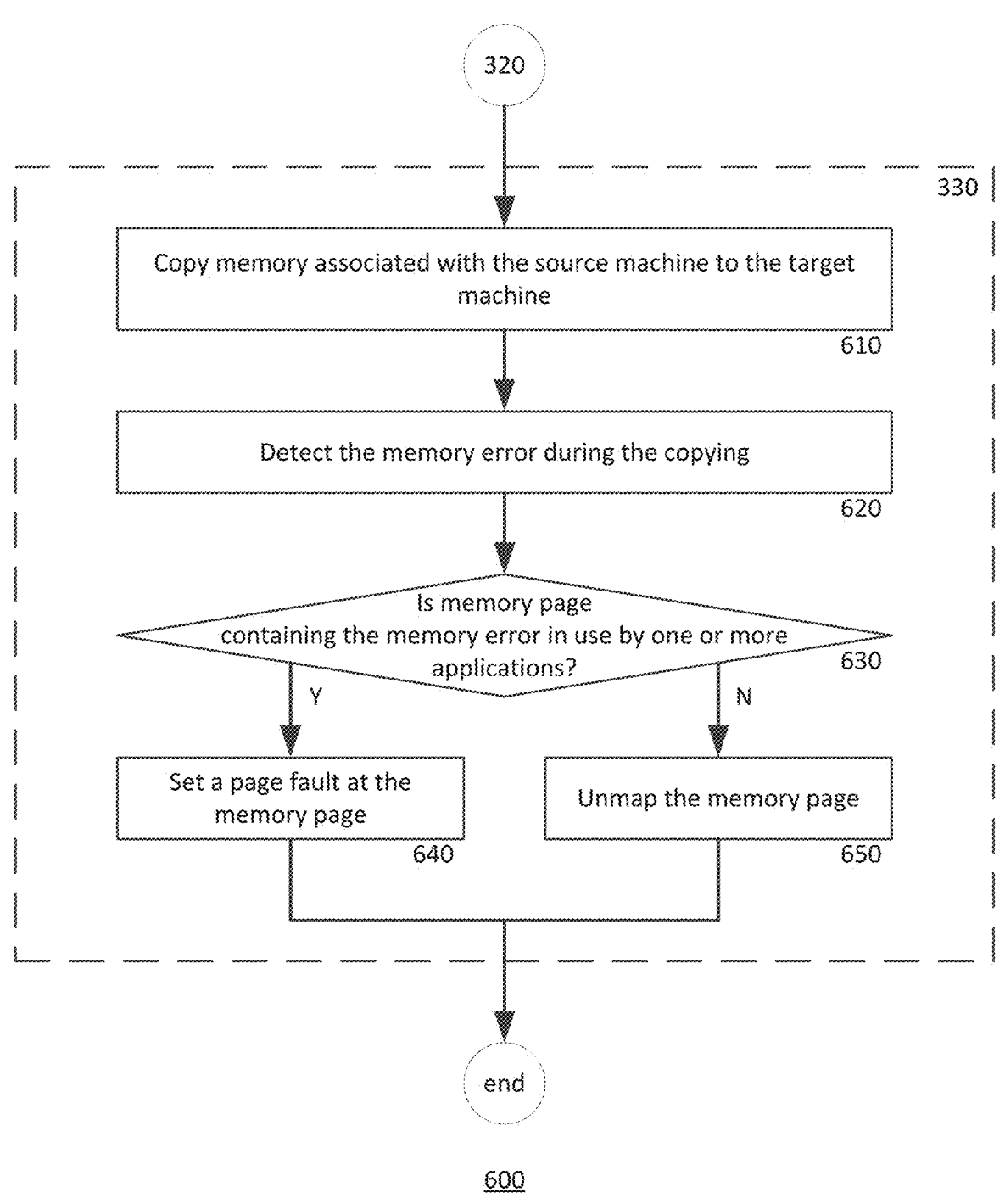

FIG. 6 is an example subroutine 600 for copying pages of a source VM's guest memory to a target VM. Blocks 610 and 620 of FIG. 6 are comparable to blocks 510 and 520 of FIG. 5, except that the reading operations associated with the copying are particularly for guest memory of the source VM. Operations may then continue at block 630, in which the one or more processors may determine whether the guest memory page containing the detected memory error is currently in use by one or more applications. If the faulty memory page is already in use, then even if the page were unmapped and made invisible for other applications and VMS, there is still a risk of the in-use application attempting to read from the faulty memory page, and such an attempt may result in a fatal error due to MCE signaling.

If the memory page containing the detected memory error is currently in use by one or more applications, then operations may continue at block 640, in which the one or more processors may set a page fault at the memory page. After setting the page fault, if the one or more applications attempts to read from the memory page, the page fault will prevent the read operation from reaching an MCE error.

Conversely, if the memory page containing the detected memory error is not in use by any applications, then operations may continue at block 650, in which the one or more processors may unmap the memory page. After the page has been unmapped, it may be effectively invisible to applications and VMs attempting to access it, so there is no more concern of a read operation causing an MCE error.

Both setting a page fault and unmapping a page results in the entire memory page being inaccessible to applications and VMs. Therefore, the one or more processors may direct the memory error, such as an injected SRAO MCE error, to a free page of the guest memory that is unused. Typically, about 50% of guest memory is free unused pages, so it is feasible to isolate the injected memory error to a free page without sacrificing significant VM memory availability.

The system and methods described herein achieve improved memory poison recovery (MPR), particularly in virtual environments. For example, the systems and methods provide for faster response time to memory errors by detecting the errors during write operations and not waiting for read operations. Furthermore, the systems and methods provide for early discovery of additional errors in the memory during a live migration pre-copy phase initiated in response to the initially detected write error. Overall, these systems and methods have been found to improve the coverage rate for uncorrectable memory error signaling by about 50%. Additionally, the systems and methods prevent future crashes from occurring by isolating the detected memory errors on free guest memory pages. This has been found to reduce the crash rate on memory errors inside guest memory also by about 50%. The increase in error detect and reduction in crashes results in less downtime for VM services, loss of less data, and an overall improved user experience.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:

detecting, by one or more processors, a memory error in memory of a source virtual machine (VM) of a computing system;

in response to detection of the memory error, injecting, by the one or more processors, a virtual software recoverable action optional (SRAO) machine check exception to the source virtual machine; and in response to the injected virtual SRAO machine check exception, isolating, by the one or more processors, the detected memory error.

2. The method of claim 1, further comprising copying, by the one or more processors, memory associated with the source virtual machine to a target virtual machine, wherein isolating the detected memory error does not disrupt the copying of the memory.

3. The method of claim 1, wherein injecting the virtual SRAO machine check exception comprises injecting the virtual SRAO machine check exception to a guest memory page associated with a guest operating system to prevent reading of the guest memory page to a target host virtual machine.

4. The method of claim 1, wherein isolating the detected memory error comprises isolating a memory page containing the memory error.

5. The method of claim 1, wherein injecting the virtual SRAO machine check exception is performed by a live migration pre-copy thread.

6. The method of claim 1, further comprising:

in response to detecting the memory error, transmitting, by the one or more processors, the memory error to a monitoring agent;

decoding, by the monitoring agent, the memory error; and determining, from the decoded memory error, that the memory error is uncorrectable, wherein injecting the machine check exception to the source virtual machine is in response to determining that the memory error is uncorrectable.

7. The method of claim 6, wherein the memory error is a corrected machine check interrupt (CMCI) error, and wherein the one or more processors are programmed such that CMCI signaling is enabled for uncorrectable errors.

8. The method of claim 7, wherein determining that the memory error is uncorrectable comprises determining that the CMCI error is coded as an un-corrected no action (UCNA) error.

9. A system for memory error recovery comprising:

one or more processors; and memory in communication with the one or more processors, wherein the memory contains instructions configured to cause the one or more processors to:

detect a memory error in memory of a source virtual machine (VM) of a computing system;

in response to detection of the memory error, inject a virtual software recoverable action optional (SRAO) machine check exception to the source virtual machine; and in response to the injected virtual SRAO machine check exception, isolate the detected memory error.

10. The system of claim 9, wherein the instructions are configured to cause the one or more processors to copy memory associated with the source virtual machine to a target virtual machine, wherein isolation of the detected memory error does not disrupt the copying of the memory.

11. The system of claim 9, wherein the instructions are configured to cause the one or more processors to inject the virtual SRAO machine check exception to a guest memory page associated with a guest operating system to prevent reading of the guest memory page to a target host virtual machine.

12. The system of claim 9, wherein the instructions are configured to cause the one or more processors to isolate a memory page containing the memory error.

13. The system of claim 9, wherein the instructions are configured to cause the one or more processors to perform injection of the virtual SRAQ machine check exception by a live migration pre-copy thread.

14. The system of claim 9, wherein the instructions are configured to cause the one or more processors to:

in response to detection of the memory error, transmit the memory error to a monitoring agent to be decoded; and determine, from the decoded memory error, that the memory error is uncorrectable, wherein injection of the machine check exception to the source virtual machine is in response to a determination that the memory error is uncorrectable.

15. The system of claim 14, wherein the memory error is a corrected machine check interrupt (CMCI) error, and wherein the one or more processors are programmed such that CMCI signaling is enabled for uncorrectable errors.

16. The system of claim 15, wherein the instructions are configured to cause the one or more processors to determine that the memory error is uncorrectable based on the CMCI error being coded as an un-corrected no action (UCNA) error.

* * * * *